Dec. 18, 1928.
M. F. FABER ET AL
1,695,644
FRAME FOR PHOTOGRAPHIC FILMS
Filed April 14, 1924
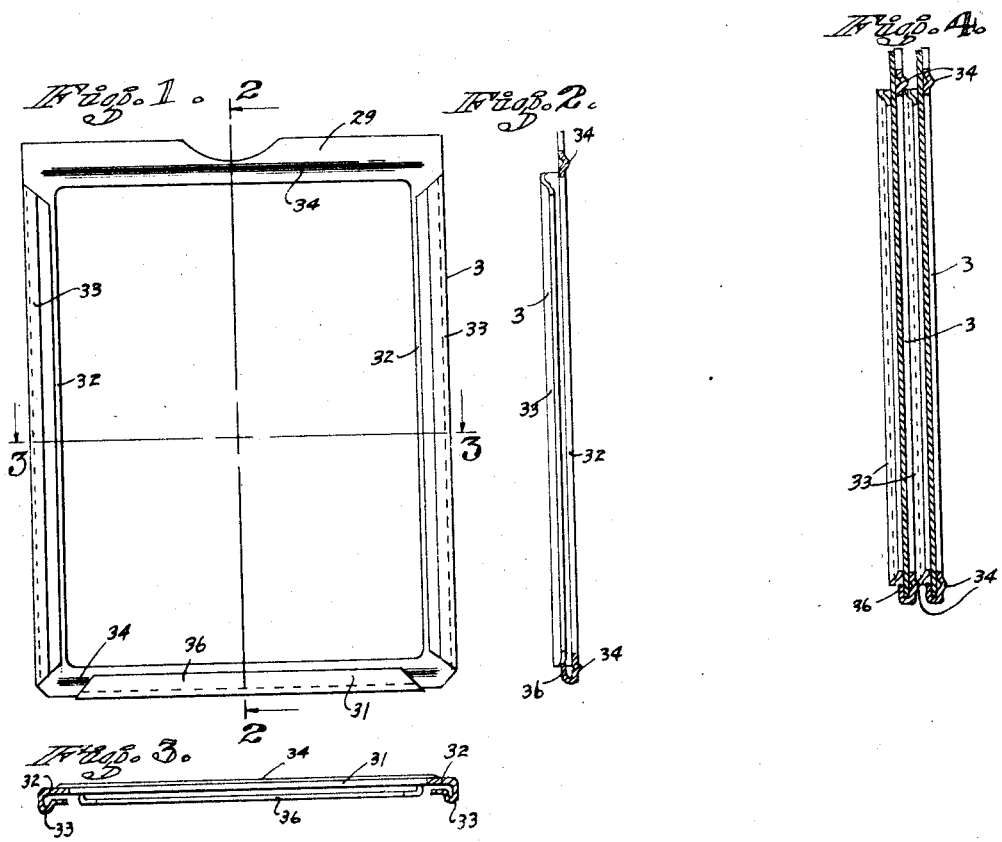
Inventor
MERLE F. FABER
JOSEPH KUSBER, JR.
Attorneys Patented Dec. 18, 1928.

1,695,644

UNITED STATES PATENT OFFICE.

MERLE F. FABER, OF DALY CITY, AND JOSEPH KUSBER, JR., OF COLMA, CALIFORNIA.

FRAME FOR PHOTOGRAPHIC FILMS.

Application filed April 14, 1924. Serial No. 706,441.

The present invention relates to improvements in frames for cut films.

The preferred form of the invention is illustrated in the accompanying drawing, in which Figure 1 is a side view of a frame 4 holding an individual film, Figure 2 a section taken along line 2—2 of Figure 1, Figure 3 a section taken along line 3—3 of Figure 1, and Figure 4 is a vertical section showing two frames in adjacent relation. While we have shown only the preferred form of the invention, we wish to have it understood that various changes or modifications may be made within the scope of the claim hereto attached without departing from the spirit of the invention.

The frame 3 comprises a top member (29), a bottom member (31), and side members (32) joining the two. The side members are provided with flanges (33) rising from the outer edge of the side members and turned over in the manner shown in Figure 3 to form a guide with the side members for the film to be inserted. The turned flanges (33) are formed with an outward curve which causes the same to project into space farther than would be necessitated by its mere guiding function which allows the same to serve as spacing members.

The top and bottom members (29) and (31) are beaded as shown at (34) and the bottom member is also provided with an overturned flange (36) adapted to receive the end of the film and to prevent the same from curling.

We claim:

In a device of the character described, a frame for holding a film comprising longitudinal and transverse frame members, marginal flanges of the longitudinal members turned upon the latter allowing the film to be slidably received between the flanges and the frame members and a flange on the remote transverse frame member formed to stop the film and to confine the upper edge thereof with beads projecting from the idle faces of the frame members for strengthening the structure of the frame, said beads being provided with inwardly extending flanges adapted to hold the film flat, said beads being adapted to hold adjacent portions of the frame members in spaced relation.

MERLE F. FABER.
JOSEPH KUSBER, Jr.